F.M. STEREOPHONIC RECEIVER USING AN INSULATED-GATE-FIELD-EFFECT TRANSISTOR FOR COMBINING THE SUBCARRIER AND COMPOSITE WAVES

Filed April 1, 1963 2 Sheets-Sheet 1

INVENTOR.
JAMES F. MERRITT
BY Eugene M. Whitacre
ATTORNEY

Aug. 2, 1966 J. F. MERRITT 3,264,413

F.M. STEREOPHONIC RECEIVER USING AN INSULATED-GATE-FIELD-EFFECT TRANSISTOR FOR COMBINING THE SUBCARRIER AND COMPOSITE WAVES

Filed April 1, 1963 2 Sheets-Sheet 2

INVENTOR.

JAMES F. MERRITT

BY Eugene M. Whitacre

ATTORNEY 3,264,413

FM STEREOPHONIC RECEIVER USING AN INSULATED-GATE - FIELD - EFFECT TRANSISTOR FOR COMBINING THE SUBCARRIER AND COMPOSITE WAVES

James F. Merritt, Trenton, N.J., assignor to Radio Corporation of America, a corporation of Delaware Filed Apr. 1, 1963, Ser. No. 269,524
9 Claims. (Cl. 179—15)

This invention relates to radio signal receiving systems and more particularly to demodulator circuits for stereophonic frequency modulation (FM) broadcast receivers.

In accordance with present FM stereophonic broadcast practices, a transmitter of stereophonic signals radiates a carrier which is frequency modulated by a composite wave comprising (1) the sum of the stereophonically related signals ($L+R$); (2) the amplitude modulation products of a suppressed subcarrier wave which is modulated by the difference of the stereophonically related signals ($L-R$); and (3) a pilot or auxiliary wave which is one-half the frequency of the suppressed subcarrier. The pilot wave may be very small in amplitude, about 9% of the amplitude of the total modulating signal wave. This transmitted wave may be received either monophonically by a monophonic receiver or stereophonically by a stereophonic receiver.

The FM demodulator of a monophonic FM receiver, tuned to the transmitted stereophonic frequency modulated radio wave, is operable to develop the above defined composite wave. This composite wave is applied to the deemphasis circuit of the monophonic receiver, which greatly attenuates the suppressed subcarrier modulation products and the pilot wave, and translates only the sum or $L+R$ signal to the loudspeaker system.

At the output of the FM demodulator of a similarly tuned stereophonic FM receiver, the above defined composite wave appears. This composite wave is processed to separate the L and R signals from the composite signals. The separated L and R signals are amplified if necessary and the L signals are applied to one loudspeaker system and R signals are applied to another loudspeaker system.

In a known system of FM stereophonic detection, the pilot wave used to regenerate the subcarrier, which subcarrier is combined with the composite wave. The resultant combination is an amplitude modulated signal one envelope of which represents the R signal and the other envelope which represents the L signal. For recovery of the L and the R signals from the composite signal, not only must the restored subcarrier have the correct frequency and phase relation with respect to the subcarrier modulation products, but the restored carrier should have an amplitude so that the amplitude modulation thereof does not exceed 100%. Above the required minimum amplitude of the restored subcarrier, the amplitude of the recovered L and R signals is substantially independent of the amplitude of the restored carrier.

It is an object of this invention to provide a simplified multiplex demodulator for combining a restored subcarrier with the composite wave derived from the frequency modulation detector of an FM receiver to obtain a resultant modulated wave, one envelope of which represents the L signal and the other envelope of which represents the R signal.

It is a further object of this invention to provide a simple, efficient and inexpensive demodulator for stereophonic FM broadcast receivers.

In accordance with this invention, a composite wave comprising an audio wave representing $L+R$ signals, the suppressed subcarrier amplitude modulation products of a subcarrier wave and the $L-R$ signals, and a pilot wave of one-half the frequency of the suppressed subcarrier and at a predetermined phase relationship to the modulation products, are derived from the demodulator of a frequency modulation receiver. The composite wave is applied to a first input electrode of an amplifier or wave combining device. A first output circuit coupled to the wave combining device is provided for separating the pilot wave from the composite wave. The frequency of the separated pilot is doubled to provide the restored subcarrier wave which is then applied in the proper phase relationship with respect to the $L-R$ suppressed subcarrier modulation products to a second input electrode of the wave combining device. The second input electrode of the amplifying device may exhibit a transconductance that is greater than the transconductance of the first input electrode. The combining device acts to combine all the waves applied thereto, so that the resultant wave appearing in a second output circuit coupled to the wave combining device includes the restored subcarrier wave amplitude modulated in a manner that one envelope thereof represents one of the stereophonic signals and the other envelope thereof represents the other of the stereophonic signals. If the transconductance of the second input electrode to which the restored subcarrier wave is applied, is great enough, relative to the transconductance of the first input electrode, so that the restored subcarrier wave in the second output circuit is sufficiently large to limit the amplitude modulation thereof to less than 100%, no further amplification of the restored subcarrier wave is necessary. If this amplification is insufficient, the pilot may be amplified, before, during or after its frequency is doubled or at any combination of these periods in the processing of the pilot wave.

In accordance with a feature of this invention, the wave combining devices to which the composite wave is applied may include an amplifying device such as an insulated-gate-field-effect transistor. The composite wave is applied to the substrate of the field-effect transistor and the frequency multipled pilot wave is applied to the gate electrode thereof.

The novel features which are considered to be characteristic of the invention are set forth with particularity in the appended claims. The invention itself, both as to its organization and method of operation as well as additional objects thereof, may be understood from the accompanying drawing in which:

Figure 1:
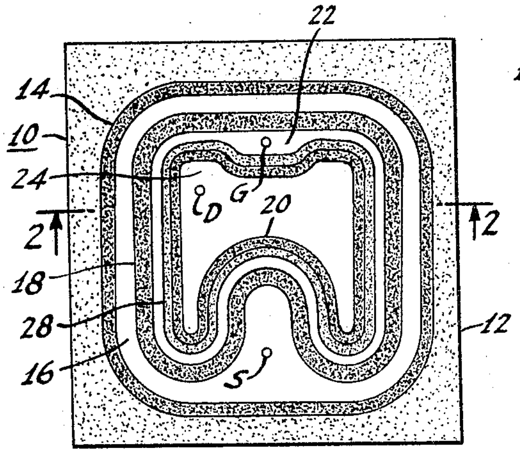
FIGURE 1 is a diagrammatic view of a field-effect transistor suitable for use in circuits embodying the invention.

Referring now to the drawings and particularly to FIGURE 1, a field-effect transistor 10 which may be used with circuits embodying the invention includes a body 12 of semiconductor material. The body 12 may be either a single crystal or polycrystalline and may be of any of the semiconductor materials used to prepare transistors in the semiconductor art. For example the body 12 may be nearly intrinsic silicon, such as for example lightly doped P-type silicon of 100 ohm-cm. material.

In the manufacture of the device shown in FIGURE 1, heavily doped silicon dioxide is deposited over the surface of the silicon body 12. The silicon dioxide is doped N-type impurities. By means of a photo-resist and acid etching, or other suitable technique, the silicon dioxide is removed where the gate electrode is to be formed, and around the outer edges of the silicon wafer, as viewed on FIGURE 1. The deposited silcon dioxide is left over those areas where the source and drain regions are to be formed.

Figure 2:
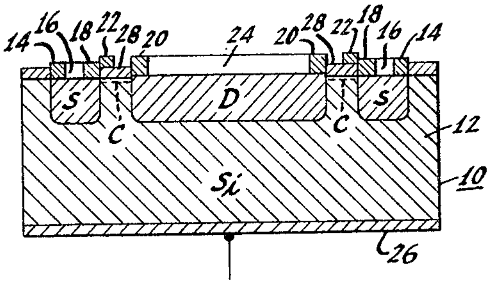
FIGURE 2 is a cross section view taken along section line 2—2 of FIGURE 1.

The body 12 is then heated in a suitable atmosphere, such as in water vapor, so that exposed silicon areas are oxidized to form grown silicon dioxide layers indicated by the lightly stippled areas of FIGURE 1. During the heating process, impurities from the deposited silicon dioxide layer diffuse into the silicon body 12 to form the source and drain regions. FIGURE 2, which is a cross sectional view taken along section 2—2 of FIGURE 1, shows, the source and drain regions labelled S and D respectively.

By means of another photo-resist and acid etching or like step, the deposited silicon dioxide over part of the source-drain diffused regions is removed. Electrodes are formed for the source, drain and gate regions by evaporation of a conductive material by means of an evaporation mask. The conductive material evaporated may be chromium and gold in the order named, for example, but other suitable metals may be used.

The finished wafer is shown in FIGURE 1, in which the lightly stippled area between the outside boundary and the first dark zone 14 is grown silicon dioxide. The white area 16 is the metal electrode corresponding to the source electrode. Dark or more heavily stippled zones 14 and 18 are deposited silicon dioxide zones overlying a portion of the diffused source region, and the dark zone 20 is a deposited silicon dioxide zone overlying a portion of the diffused drain region. White areas 22 and 24 are the metallic electrodes which correspond to the gate and drain electrodes respectively. The stippled zone 28 is a layer of grown silicon dioxide on a portion of which the gate electrode 22 is placed and which insulates the gate electrode 22 from the substrate silicon body 12 and from the source and drain electrodes, as shown in FIGURE 2.

The silicon wafer is mounted on a conductive base or header 26 as shown in FIGURE 2. The layer of grown silicon dioxide 28 on which the gate electrode 22 is mounted, overlies an inversion layer or conducting channel C connecting the source and drain regions. The gate electrode 22 is displaced towards the source region S so that the distance between the source region S and the gate electrode 22 is smaller than the distance between the gate electrode 22 and the drain region D. If desired, the gate electrode may overlap the deposited silicon dioxide layer 18.

Referring to FIGURE 2 of the drawings, the boundaries separating the source and drain regions S and D and the body of silicon substrate 12 effectively operate as a pair of rectifying junctions coupling the silicon substrate 12 to the source and drain electrodes 16 and 24, in such a manner that a positive bias voltage applied to the substrate with respect to the drain and source electrodes 16 and 24 renders the rectifying junctions conductive.

It is to be understood that the poling of the rectifying junctions described is representative of a transistor of the type described in connection with FIGURES 1 and 2 wherein the substrate is of P-type material relative to the source and drain electrodes. However, the transistor device can be fabricated where the substrate is of N-type material relative to the source and drain electrodes. In devices of the latter type, the rectifying junctions would be poled so that the anode side of the rectifying junction appears at the source and drain electrodes, and the cathode side of these junctions appears at the substrate. The description will be restricted to the type of device described in connection with FIGURES 1 and 2 wherein the substrate is of P-type material relative to the source and drain electrodes.

Figure 3:
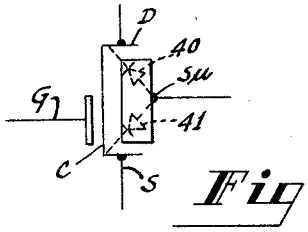
FIGURE 3 is a schematic representation of an insulated-gate-field-effect transistor.

FIGURE 3 is a symbolic representation of the insulated-gate-field-effect transistor previously described in FIGURES 1 and 2. Therein is shown the gate electrode G, the drain electrode D, the source electrode S, and the substrate S*u* of semiconductor material. It should be noted that electrodes D and S operate as the drain and the source electrodes as a function of the polarity of the bias potential applied therebetween; i.e., the electrode to which a positive bias potential is applied (relative to the bias potential applied to the other electrode) operates as a drain electrode, and the other electrode operates as a source electrode. The rectifying junctions, described hereinabove, are diagrammatically indicated in FIGURE 3 by dotted symbols 40 and 41.

Figure 4:
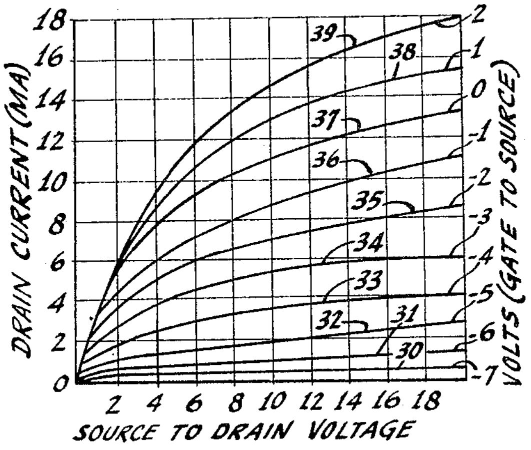
FIGURE 4 is a graph showing a family of drain current versus source-to-drain voltage curves for various values of gate-to-source voltages for the transistor of FIGURE 1.

FIGURE 4 is a family of curves 30–39 illustrating the source-to-drain current versus source to drain voltage characteristics of the transistor of FIGURE 1 for different values of gate-to-source potential, the substrate being kept at source potential. A feature of an insulated-gate-field-effect transistor is that the zero bias characteristic can be at any of the curves 30–39. In FIGURE 4 the curve 37 corresponds to the zero bias gate-to-source voltage. Curves 38 and 39 represent positive gate voltages relative to the source and the curves 30–36 represent negative gate voltages relative to the source.

The location of the zero bias curve is selected during the manufacture of the transistor, i.e., by controlling the time and/or temperature of the step of the process when the silicon dioxide layer 28 shown in FIGURES 1 and 2 is grown.

Figure 5:
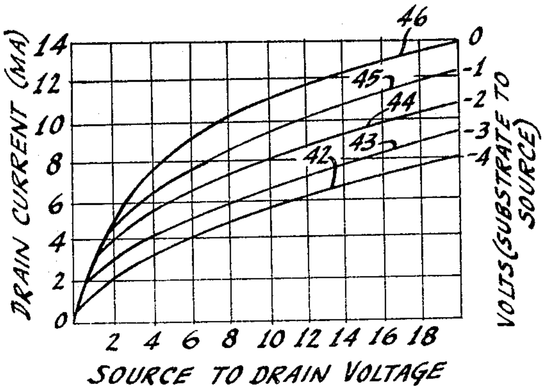
FIGURE 5 is a graph showing a family of drain current versus source-to-drain voltage curves for various values of substrate-to-source voltages for the transistor of FIGURE 1.

The substrate S*u* may be used as an input electrode. The curves of FIGURE 5 show source to drain current plotted against source to drain voltage for various values of substrate voltage with respect to the source, the gate being held at source potential, for an insulated-gate-field-effect transistor in which the substrate is of P-type material. In FIGURE 5, the curve 46 corresponds to zero voltage on the substrate with respect to the source and this curve 46 of FIGURE 5 is therefore identical with curve 37 of FIGURE 4. Curves 42–45 correspond respectively to −4, −3, −2, and −1 volts on the substrate with respect to the source. These curves 42–46 of FIGURE 5 are closer together on the same scale than curves 33–37 of FIGURE 4, indicating that the amplification factor of the insulated-gate-field-effect transistor using the substrate as an input electrode is less than the amplification factor thereof using the gate as an input electrode.

An insulated-gate-field-effect transistor, similar to the one described in connection with FIGURES 1 and 2, has an input impedance measured between the gate electrode and the source electrode that appears as a parallel circuit comprising a small capacitor (approximately $2\times10^{-12}$ farads) and a leakage resistor of approximately $10^{14}$ ohms (for low frequencies such as audio frequencies). The input impedance between the substrate and the source is also high for audio frequencies when the substrate is reverse biased relative to the source electrode.

Figure 6:
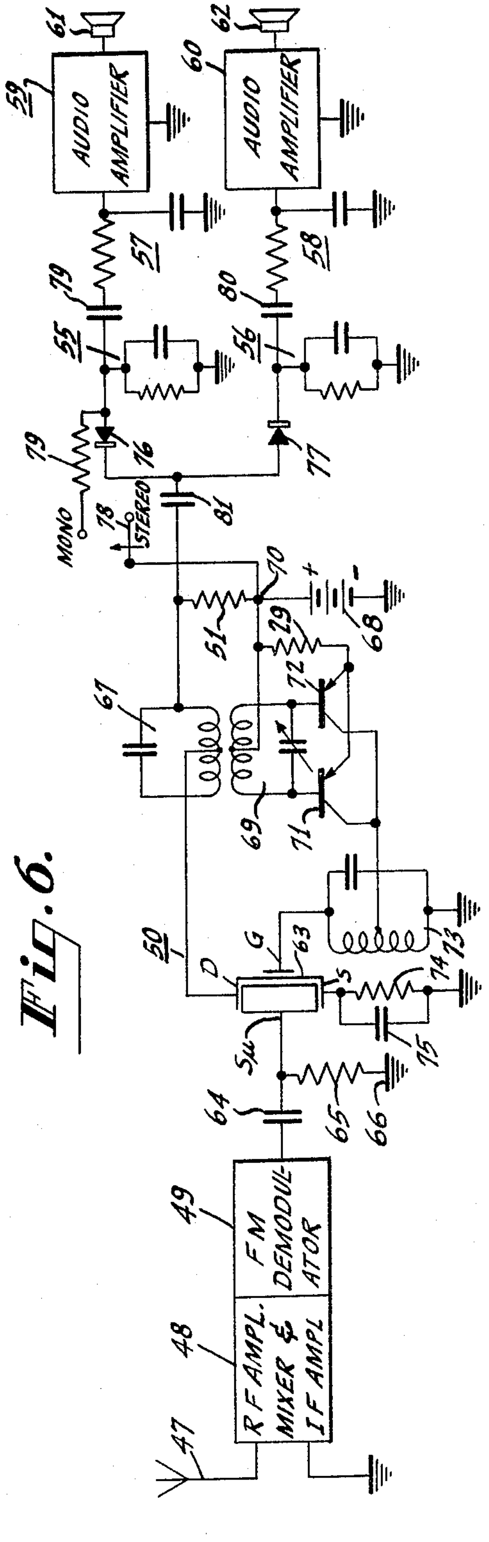
FIGURE 6 is a schematic circuit diagram of a stereophonic FM radio receiver embodying the invention.
Figure 7:
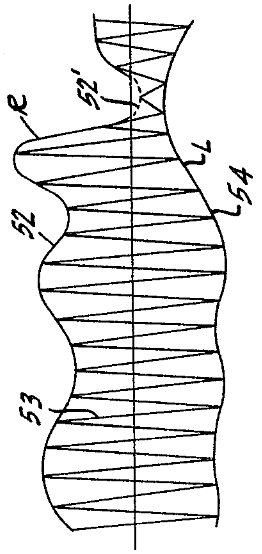
FIGURE 7 is a graph representing the wave resulting from the combining of the composite signal with the restored subcarrier wave.

Referring to FIGURE 6 of the drawings, a frequency modulated transmitted wave is intercepted by the antenna 47 and is applied therefrom to the RF amplifier, mixer and IF amplifier 48. The output of the mixer and amplifier 48 is applied to the input of an FM demodulator 49. The output of the demodulator 49, comprising the composite wave defined above, is applied to a subcarrier restoring and combining circuit 50 which will be described in detail hereinbelow. The output of the restoring and combining circuit 50, appears across a load resistor 51, and may be represented as an amplitude modulated subcarrier wave 53 as shown in FIGURE 7. The positive envelope 52 of the wave 53 represents the R signals and the negative envelope 54 represents the L signals. The peak detectors 55 and 56, to which the output of the restoring and combining circuit 50 is coupled in parallel, demodulate the negative and the positive envelopes 54 and 52 respectively to derive the resultant L and the R signals. These signals are applied to the deemphasis circuits 57 and 58 and are respectively amplified in audio amplifiers 59 and 60 before being applied to speakers 61 and 62.

The subcarrier restoring and combining circuit 50 includes an insulated-gate-field-effect transistor 63. The composite wave appearing at the output of the demodulator 49 is applied to the substrate S*u* of transistor 63 through a blocking capacitor 64. A resistor 65 is connected between the substrate S*u* and a point of reference potential indicated by the ground symbol 66.

The drain D is connected to a tap on the inductor of a parallel tuned circuit 67 resonant at the pilot frequency. One terminal of the tuned circuit 67 is connected through a load resistor 51 to the positive terminal of a battery 68, the negative terminal of which is connected to a point of reference potential. Therefore a D.C. path is provided from the drain D to the positive terminal of the battery 68. A second tuned circuit 69 having a variable tuning capacitor and nominally tuned to the pilot wave frequency, is inductively coupled to the first tuned circuit 67. The second tuned circuit may be tuned off the pilot wave frequency, for a reason which is explained hereinafter.

The center tap of the inductor of the second tuned circuit 69 is connected to the junction 70 of the load resistor 51 with the battery 68. The bases of two bipolar transistors 71 and 72 are connected to opposite end terminals of the second tuned circuit 67. The emitters of the two transistors 70 and 71 are connected together and to the junction point 70 through a resistor 29. The collectors of the two transistors are connected together, whereby the tuned circuit 69, the transistors 71 and 72 and their connections act as an amplifying frequency doubler.

The collectors of the two transistors 71 and 72 are connected through a portion of the inductor of a tuned circuit 73 to the point of reference potential. The tuned circuit 73 is tuned to the frequency of wave appearing at the collectors of the transistors 71 and 72 which is double the frequency of the pilot wave appearing in tuned circuit 69, whereby the restored subcarrier appears in tuned circuit 73.

The subcarrier appearing in circuit 73, is applied to the gate G of transistor 63. The subcarrier restoring and combining circuit 50 is completed by a resistor 74, bypassed by a capacitor 75, connected between the source S of the transistor 63 and the point of reference potential. The voltage built up across resistor 74 by current flow in the series circuit including the drain and source of the transistor 63 is applied as negative bias between source S and the gate G through the inductor of the tuned circuit 73 to bias the gate. The voltage across the resistor 74 also biases the source with respect to the substrate S*u*, the substrate being connected to D.C. ground through the resistor 65. This substrate to source voltage is in such a direction and is of such amplitude as to reverse bias the diode rectifying junction (indicated by dotted symbols for diode 41 in FIGURE 3) between the substrate S*u* and the source S of the transistor 63 for all signal voltages.

The operation of the subcarrier restoring circuit may be explained as follows: The composite wave applied to the substrate S*u* of transistor 63 is amplified and appears in amplified form at the drain D thereof. The pilot wave, which may be of a 19 kc.s. frequency, is selected by tuned circuits 67 and 69, and by means of the connection of transistors 71 and 72, a rectified and amplified full wave voltage appears at the collectors of transistors 71 and 72. The tuned circuit 73 selects the double frequency component (which is of subcarrier wave frequency, 38 kc.s. in this example) from the rectified full wave applied thereto. The inductor of the tuned circuit 73 acts as an auto-transformer, whereby the voltage of the subcarrier frequency is stepped up. The stepped up voltage is applied to gate G and is amplified by the transistor 63. Due to the amplification thereof by transistors 71, 72 and 63 and the votlage step up transformation by the inductor of tuned circuit 73, the amplitude of the wave of subcarrier frequency appearing at the drain D is sufficiently great that there is less than 100% modulation of the subcarrier wave 53 appearing across load resistor 51.

If there is more than 100% modulation, there is a sudden discontinuity of the R (or L) signal every time the R (or L) signal envelope 52 (FIGURE 7) goes through zero, as illustrated for R signals at 52′. These discontinuities, together with the absence of the signal between them, distorts the signal applied to the speaker. This type of distortion is avoidable by maintaining the amplitude at the restored subcarrier great enough so that neither the R or the L envelope 52 or 54 goes through zero. That is, demodulation is less than 100% under all signal conditions. The amplitude of the restored carrier has little effect on the amplitude or quality of the L or R signals if the restored carrier is so great that demodulation is less than 100%. While the described combining device 50 provides a subcarrier which varies in amplitude in accordance with the amplitude of the received pilot component of the composite wave, sufficient amplification is provided by the combining device so that the restored carrier amplitude is at least great enough to provide the required 100% or less modulation.

Furthermore, the frequency of the restored subcarrier is determined by the frequency of the pilot wave. The phase of the restored carrier with respect to the suppressed subcarrier balanced modulation products is determined by the phase of the pilot wave as modified by the phase changes of the pilot and restored subcarrier in the described wave combining circuit. If the relative phase of the subcarrier applied to gate G and the suppressed carrier modulation products is incorrect, this phase relation can be corrected by varying the tuning of circuit 69, for example, by varying the variable capacitor. The restored carrier combines with the $L+R$ audio signal and with the suppressed carrier $L-R$ modulation products to produce a wave 53 such as that of FIGURE 7. This wave 53 appears across load resistor 51. If some small pilot signal or small carrier signal appears at the detectors, such small signals are further reduced in the detectors.

While a particular circuit has been described for selecting the pilot wave from the wave appearing at the output of transistor 63 and for frequency doubling the selected wave, it is to be understood that this circuit is exemplary. If sufficient amplification of the restored subcarrier is not provided by the transistors 71 and 72 and transistor 63, further amplification may be provided. This amplification may take place before frequency doubling, during doubling or after doubling or any combination thereof. Furthermore, any desired frequency doubler may be used instead of the frequency doubler shown. For example, a frequency doubler such as a pair of diodes may be used. The doubler shown has the advantage of amplifying and doubling simultaneously.

As shown in FIGURE 6, the composite wave is applied to the substrate S*u* and the doubled frequency wave is applied to the gate G. However, the gate and the substrate connections may be interchanged if sufficient further amplification is otherwise supplied for the selected pilot wave or for the doubled frequency wave, to bring the restored carrier up to the amplitude corresponding to 100% modulation or less. The insulated gate field-effect transistor provides an especially effective amplifying device in the circuit.

If a monophonic signal is received by the described receiver, the wave appearing across resistor 51 will be an audio frequency wave, since no pilot wave is supplied with monophonic transmission. Peak detectors 55 and 56 would cause distortion of this audio wave because of their detecting properties. Therefore, to reduce the distortion introduced by the described circuit during reception of monophonic signals, a means is provided to bias the diodes 76 and 77 of peak detectors 55 and 56 in a forward direction to a point beyond the knee of the current versus voltage characteristic thereof, where they present substantially the same impedance for increasing and for decreasing currents passing therethrough. To this end, a single pole switch 78 is provided. The pole of the switch is connected to the anode of the diode 76 through a decoupling resistor 79. The blade of the switch 78 is connected to the positive terminal of supply 68. In the open or stereophonic position of the switch 78, no biasing voltage is applied to the diodes 76 and 77 and they act as the rectifying elements of peak detectors 55 and 56. When the switch is changed to its monophonic position, the diodes 76 and 77 are biased to the point where they do not act as detector elements, and the audio wave appearing across resistor 51 is applied to loudspeakers 61 and 62 by way of deemphasis circuits 57 and 58 and amplifiers 59 and 60. Capacitors 79 and 80 are provided between the peak detectors 55 and 56 and deemphasis circuits 57 and 58 respectively. These capacitors, together with blocking capacitor 81 connected between the junction of the load resistor 51 and the tuned circuit 67 and diodes 76 and 77 confine the flow of direct current to a path including diodes 76 and 77 in series.

While peak detectors 55 and 56 have been shown, average detectors may be used to detect the positive and negative envelopes respectively of the wave applied thereto. However, since cross talk appears in the output of each average detector when used to detect opposite envelopes of a wave whose opposite envelopes represent different signals, additional means would then be desirable to attenuate this crosstalk. This additional means may comprise respective amplifiers between the outputs of the average detectors and the speaker systems, these amplifiers being so cross-connected that each amplifier bucks out the crosstalk in the other amplifier.

What is claimed is:

1. Means for producing a carrier wave which is amplitude modulated in one polarity by a first audio wave and in the opposite polarity by second audio wave comprising,
- an amplifier having a first input electrode, a second input electrode, and an output electrode,
- means for applying to said first input electrode a composite wave comprising an audio wave representing the sum of said first and second audio waves, the suppressed carrier balanced modulation products of a carrier wave and an audio wave representing the difference of said first and second audio waves, and a pilot wave,
- means for selecting said pilot wave from the amplified waves appearing at the output electrode of said amplifier,
- means for changing the frequency of said pilot wave to the frequency of said suppressed carrier wave,
- means for applying said frequency changed wave to said second input electrode for amplification by said amplifier and for combination with said composite wave, and

- means for deriving said produced wave from said amplifier.

2. In a circuit for converting a composite wave comprising the sum of two audio frequency waves, the suppressed subcarrier balanced modulation products of the difference of said two audio waves and a pilot wave related in frequency and phase to the suppressed subcarrier, into a subcarrier wave amplitude modulated in one polarity with one of said two audio waves and amplitude modulated in the other polarity with the other of said two audio waves comprising,
- an amplifier having an output connection, and a plurality of input connections,
- means for applying said composite wave to one of said input connections,
- means for separating said pilot wave from said output wave, for changing the frequency of said pilot wave to the frequency of said suppressed carrier wave, and for applying said changed frequency wave to another of said input connections in a predetermined phase relation with respect to said suppressed subcarrier balanced modulation products, and
- means for deriving said converted wave from said output connection.

3. In a stereophonic receiver, a circuit for converting a composite wave comprising the sum of two audio frequency waves, the suppressed subcarrier balanced modulation products of the difference of said two audio waves and a pilot wave related in frequency and phase to the suppressed subcarrier into a subcarrier wave modulated in one polarity with one of said two audio waves and modulated in the other polarity with the other of said two audio waves, said converting circuit comprising
- an amplifier element having an output electrode, a common electrode and a plurality of control electrodes,
- means for applying said composite wave to one of said control electrodes,
- means for separating said pilot wave from said output wave, for changing the frequency of said pilot wave to the frequency of said suppressed carrier wave and for applying said changed frequency wave to another of said control electrodes in a predetermined phase relation with respect to said suppressed subcarrier balanced modulation products,
- a pair of peak detectors arranged to detect respectively the one and the other polarity peaks of a modulated wave applied thereto, and
- means for deriving said converted wave from said output electrode and for applying said wave to said pair of detectors.

4. In a stereophonic receiver,
- a frequency demodulator having an output,
- a pair of detectors arranged to detect respectively the positive and the negative envelopes of a modulated wave applied thereto,
- an insulated-gate-field-effect transistor having a source electrode, a drain electrode, a gate electrode and a substrate,
- means for coupling the output of said frequency demodulator to said substrate,
- a tuned circuit connected between said gate and source electrodes and tuned to a pilot frequency,
- frequency doubling means coupled between said tuned circuit and said gate electrode,
- a load means connected between said drain and said source electrode, and
- means for applying the wave appearing across said load means in parallel to said pair of detectors.

5. In a stereophonic receiver including an FM demodulator, a wave modifying circuit comprising:
- an insulated-gate-field-effect transistor having drain, gate and source electrodes and a substrate,
- means for applying a composite wave including a pilot wave and several components appearing at the output of said demodulator to said substrate, means for selecting said pilot wave from the output wave appearing at the drain electrode of said transistor, means for applying said selected wave in frequency multiplied form to said gate electrode, whereby a modified wave appears at said drain electrode, and means for applying said modified wave to detecting means.

6. In a stereophonic receiver including an FM demodulator, a wave modifying circuit comprising:

an insulated-gate-field-effect transistor having drain, gate and source electrodes and a substrate, means for applying a composite wave including a pilot wave, an audio wave and the suppressed subcarrier modulation products of another audio wave appearing at the output of said demodulator to said substrate, means for selecting said pilot wave from the output wave appearing at the drain electrode of said transistor, means for multiplying the frequency of and amplifying said selected pilot wave, means for applying said frequency multiplied and amplified wave to said gate electrode, whereby a modified wave appears at said drain electrode at a multiple of the frequency of said pilot wave and modulated in one polarity by the sum of said audio waves and modulated in the other polarity by the difference of said audio waves, and means for appearing said pilot wave in amplified and means.

7. In a stereophonic receiver including an FM demodulator, a subcarrier wave restoring circuit comprising:

an insulated-gate-field-effect transistor having a source electrode, a gate electrode, a drain electrode and a substrate, means for applying a composite wave appearing at the output of said demodulator to said substrate, said composite wave including a pilot wave, an audio representing $L+R$ signals, and the suppressed subcarrier amplitude modulation products of an audio wave representing $L-R$ signals, means for selecting said pilot wave from the wave appearing at said drain electrode, and means for applying said pilot wave in amplified and frequency doubled form to said gate electrode, whereby a modulated wave appears at said drain electrode of the frequency of said suppressed subcarrier, the positive envelope of said last mentioned modulated wave representing one of said L and R signals and the negative envelope of said last mentioned modulated wave representing the other of said L and R signals.

8. In a stereophonic receiver including an FM demodulator, a subcarrier wave restoring circuit comprising, an insulated-gate-field-effect transistor having a source electrode, a gate electrode, a drain electrode and a substrate, means for applying a composite wave appearing at the output of said demodulator to said substrate, said composite wave including a pilot wave, an audio wave representing $L+R$ signals, and the suppressed subcarrier amplitude modulation products of an audio wave representing $L-R$ signals, means for selecting said pilot wave from the wave appearing at said drain electrode, means for applying said pilot wave in amplified and frequency doubled form to said gate electrode, whereby a modulated wave appears at said drain electrode of the frequency of said suppressed subcarrier, the positive envelope of said last mentioned modulated wave representing one of said L and R signals and the negative envelope of said last mentioned modulated wave representing the other of said L and R signals, a pair of oppositely poled detectors, and means for applying said last-mentioned modulated wave in parallel to said peak detectors.

9. Means for producing from a composite wave comprising the sum of first and second stereophonically related audio waves, the suppressed carrier balanced modulation products of a carrier wave and the difference of said audio waves, and a pilot wave having a frequency and a phase relationship related to said suppressed carrier wave, a carrier wave amplitude modulated in one polarity with one of said audio waves and amplitude modulated in the other polarity with the other of said audio waves, said producing means comprising an amplifier having a first input electrode, a second input electrode, and an output electrode, means for applying said composite signal to said first input electrode, an output circuit for said amplifier connected to said output electrode and having first and second portions, said first portion including means for selecting said pilot wave from the waves appearing at the said output electrode, means for changing the said pilot wave selected by said first portion to a reconstituted carrier wave having the frequency and phase of said suppressed carrier, means for applying said reconstituted carrier wave from said changing means to said second electrode, said second output portion having output terminal means, for applying said reconstituted carrier wave modulated in one polarity with one of said audio waves and modulated in the other polarity with the other of said audio waves to an output circuit.

No references cited.

DAVID G. REDINBAUGH, *Primary Examiner.*

R. GRIFFIN, *Assistant Examiner.*